INVENTOR
Niles F. Guichet
BY
ATTORNEY

Sept. 26, 1967  N. F. GUICHET  3,343,264
DENTAL ARTICULATOR AND METHOD OF USE

Filed May 3, 1965  4 Sheets-Sheet 2

INVENTOR
Niles F. Guichet
BY
ATTORNEY

Sept. 26, 1967  N. F. GUICHET  3,343,264
DENTAL ARTICULATOR AND METHOD OF USE
Filed May 3, 1965  4 Sheets-Sheet 3

INVENTOR.
Niles F. Guichet
BY
ATTORNEY

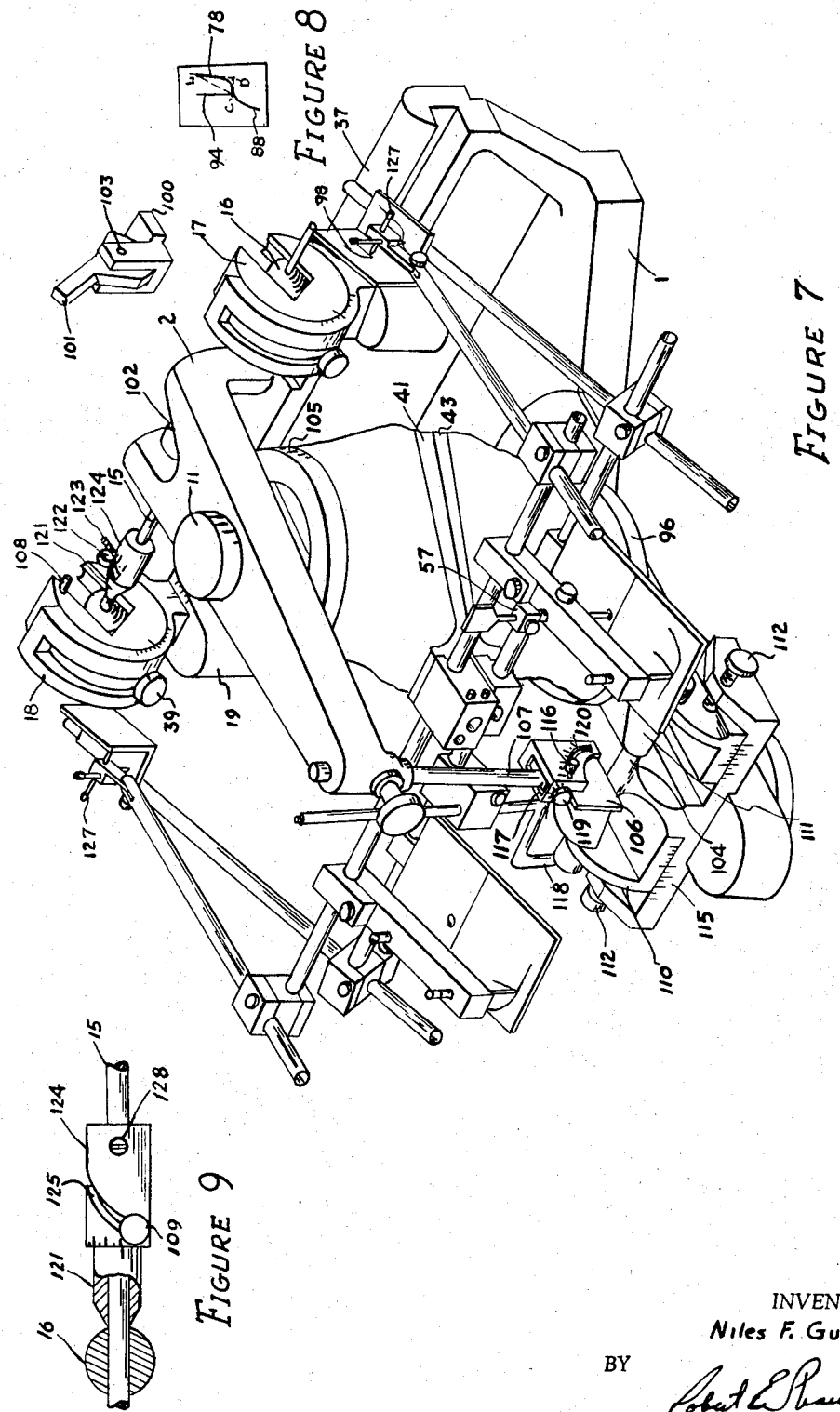

United States Patent Office 3,343,264
Patented Sept. 26, 1967

3,343,264
DENTAL ARTICULATOR AND
METHOD OF USE
Niles F. Guichet, 320 Olympia Place,
Anaheim, Calif. 92805
Filed May 3, 1965, Ser. No. 452,735
9 Claims. (Cl. 32—32)

This application is a continuation-in-part of my co-pending applications, Ser. Nos. 301,039, 348,013 and 389,240.

This invention relates to a method of reconstructive dentistry and to improved apparatus for fabrication of occlusions of dental inlays, bridges, dentures, etc. to permit the accurate laboratory fabrication of the latter and eliminate the tedious custom grinding and fitting commonly required.

In particular, this invention relates to an improved dental tracing device for obtaining an accurate recording of the jaw movements and to improvements in a dental articulator permitting the accurate fabrication of dental inlays and bridges.

The apparatus of my invention is useful in the method of reconstructive dentistry wherein an impression of the teeth is obtained in a conventional manner and plaster models are formed from the impressions with a stud incorporated therein to detachably mount the models in the articulator. The models are placed in the articulator which has a universal mounting means and an improved clutch-forming jig to fabricate dental clutches from the models. The dental clutches are then attached to the upper and lower face bow assemblies of the dental tracing device and used to secure these face bows to the mandibular and maxillary teeth. The protrusive, left and right lateral maximum excursions of mandible are then recorded on the tracing device. The tracing device is placed on the articulator and the articulator is set to faithfully reproduce the tracing device records. Thereafter the articulator is used in the conventional manner to wax up the models of the inlays and bridges for laboratory fabrication.

The method of my invention provides occlusions having a tolerance in the cusp-fossa fit for an immediate lateral and protrusive shift of the mandible without jaw separation. This is achieved by fabricating the wax models of the occlusions on my dental articulator having means to permit an immediate side and forward horizontal movement of the articulator members for a distance up to about 3 millimeters. Since many patients exhibit such an immediate side shift of the condyles upon lateral excursion of the mandible, failure to build a tolerance for this shift in the occlusions renders them uncomfortable and causes serious dental problems. While the occlusions can be corrected by custom grinding, this grinding is time consuming.

The method of my invention also provides a tolerance for an immediate protrusive horizontal movement of the mandible without jaw separation. The separation of the jaws is commonly caused by bearing of the opposing anterior teeth and lower first bicuspids and the mandible slides in the protrusive movement until these teeth engage. The anterior of my articulator has incisal guide means that provide for an immediate protrusive horizontal movement as well as for an immediate side horizontal movement of the anterior of the instrument in an amount up to about 3 millimeters.

The objectives of my invention are to provide an improved dental tracing device to practice the aforementioned method. The tracing device should have at least one or more of the following features:

(1) Posterior and anterior means to record jaw movements;

(2) Anterior means to record the centric orientation of the upper to the lower face bow of the panograph; and (3) Preferably, remotely controllable styli to register jaw movements.

My invention also has the specific objective of providing an improved dental articulator to practice my method which has at least one or more of the following features:

(1) Spacially adjustable means to detachably mount a model of the patient's teeth;

(2) A jig for the casting of dental clutches from models in the articulator;

(3) Side shift stop means permitting a measured and precisely controlled lateral displacement of the upper and lower articulator members; and (4) Incisal guide means to provide immediate lateral and/or protrusive shifting of the articulator members.

My invention will now be described by reference to the figures of which:

FIGURE 7 illustrates the upper and lower clutches mounted in the articulator with the tracing device attached thereto.

FIGURES 8 and 9 are supplemental to FIGURE 7.

Figure 1:
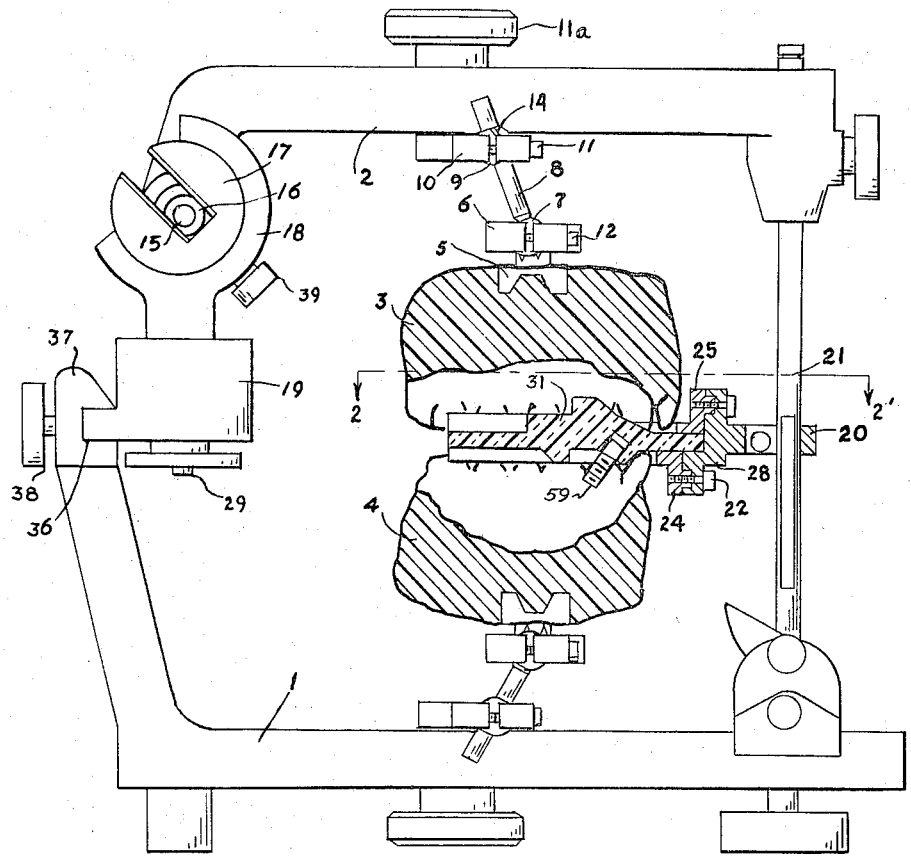
FIGURE 1 illustrates the improved dental articulator with the clutch fabrication jig and means to detachably mount a dental model in the articulator.

Referring now to FIGURE 1 there is illustrated a dental articulator having a base 1 and an upper frame 2 to which are secured upper and lower dental casts, 3 and 4. Upper frame 2 is hinged to the base 1 by shaft 15 which extends through spherical bearings 16 mounted in slots in the condyle rings 17 that are rotably mounted in journals 18. The journals are rotable about shaft 29 in support arm 19. Arm 19 has a key 36 which is slidably mounted in a track of the rear crossbar 37 of frame 1. Wheel 38 has a shaft extension that engages a tap in the rear edge of key 36 and is used to lock this arm to crossbar 37.

Figure 3:
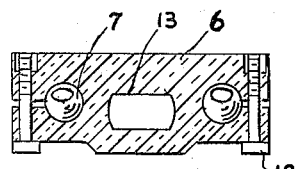
FIGURE 3 illustrates the improved model support to detachably mount the dental models in the articulator.

The dental casts are supported in the articulator by studs shown as 5 in the upper articulator which interlock into sockets 13 (shown in FIGURE 3) of cast support plates such as 6. The cast support plate 6 is supported from the articulator by a universally adjustable means comprising spherical bearings 7 through which extend the bottom of rods 8 which also extend through similar spherical bearings 9 in the upper plate 10. Plate 10 is secured to the frame 2 by wheel 11a having a threaded lower end which engages a tap in plate 10. The sockets in plate 6 are split as shown; see FIGURE 3; and screws 12 extend through the splits to tighten the socket against the spherical bearings, thereby locking any desired setting of these bearings. Similar screws lock bearings 9 against rotation in plate 10. The upper spherical bearing 9 is split as shown at 14 and the rod 8 is slidably mounted therein. Tightening of screw 12 compresses spherical bearing 9 against this rod and thereby locks against motion of the rod 8 through the split bearing 9.

The dental articulator is equipped with a clutch fabrication jig that is supported in the articulator by arm 20 attached to incisal pin 21. Screw 23 (see FIGURE 2) locks arm 20 to pin 21. Attached to arm 20 is a plate 28 having slotted fingers 27 (shown in FIGURE 2) at opposite ends. A clutch separation plate 26 extends through the slots of fingers 27. This plate can be of any suitable material, preferably a flexible rubber is employed and the plate is retained in the slotted fingers 27 by an enlarged cross-sectional edge such as 30.

Figure 2:
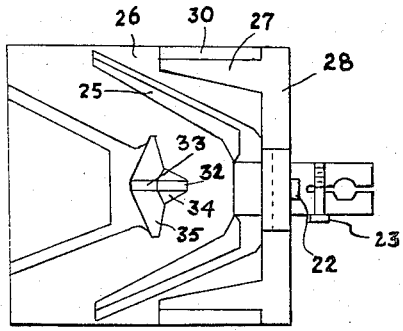
FIGURE 2 illustrates a view of the clutch fabrication jig along lines 2—2.

The shape of separation plate 26 imparts a desired shape to the underside of the upper clutch as shown in FIGURE 2. The posterior central portion of the plate has a raised surface 31 which is trapezoidal in shape and useful to retain the plastic around the model of the teeth. The anterior portion of the raised surface has a central track formed from two inclined surfaces 32 and 33. The inclination of 32 is about 16 degrees; that of 33 is about 35 degrees, as shown in cross-section in FIGURE 1. Triangular shaped wings 34 are at each side of track 32 and these wings are inclined downwardly to the base of the upper surface of plate 26. Similarly shaped wings 35 are positioned at either side of track 33. The effect of this jig is to cast a concave surface in the upper clutch molded on the fabrication jig. The concave surface has a posterior-anterior centerline defined by tracks 32 and 33. Along the centerline, the angle of inclination in a lateral direction (as shaped by wings 34 and 35) is greater than the angle of inclination in the anterior direction. At any point off the centerline, however, the angle of inclination in the lateral direction is less than the angle in the anterior direction. When used on the patient the concave surface provides a bearing surface that is engaged by pin 59 molded in the lower clutch. This shape of the bearing surface tends to maintain purely protrusive movements during recording of the jaw records since the patient will naturally follow the path of least resistance along the shallow inclined central track. In lateral excursions from the centerline, protrusive movement is discouraged by the steep incline of the sidewalls in an anterior direction to favor a purely lateral excursion of the mandible. The under surface of plate 26 has a socket into which bearing pin 59 is placed. The threaded exposed end of 59 is thereby molded in the lower clutch to provide a fulcrum for separation of the clutches in the patient's mouth and articulator.

The support forks 24 and 25 have keys which engage tracks cut into the posterior surface of plate 28. These forks are locked to plate 28 by screws 22. The support forks can be formed from any suitable material such as plastic, metal, hard rubber, etc.

After the dental casts and forks are mounted in the manner illustrated in FIGURE 1, a cold curing plastic is applied about the teeth and permitted to harden. To prevent the plastic from adhering to the teeth models or to the separation plate 26, a film or parting agent can be used such as a plastic or metal foil. Preferably, plate 26 is formed from a material having low adhesion, e.g., silicone rubber, and no parting agent is needed about plate 26.

Figure 4:
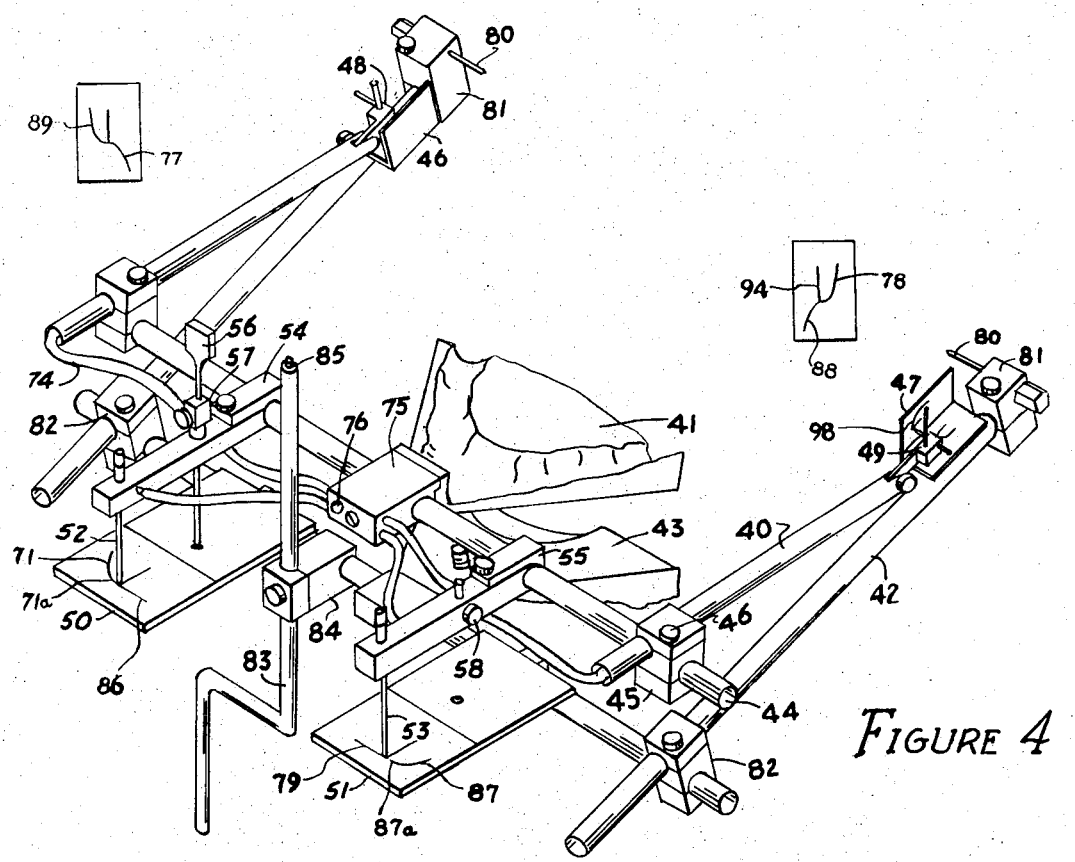
FIGURE 4 illustrates the improved dental tracing device.

Referring now to FIGURE 4 there is illustrated the tracing device of my invention. The clutches 41 and 43 molded on support forks 24 and 25 are secured to the tracing device with the key of the forks engaging a track of mounting blocks such as 75. A screw tightens the clutch to the device. The tracing device comprises an upper face bow 40 which is supported on the maxilliary teeth by clutch 41 and a lower face bow 42 which is supported on the mandibular teeth by clutch 43. The face bows are fabricated from crossbars such as the tubular rod 44 which are secured to side rods by clamping locks such as 45. Each clamping block has two perpendicular bores which are slotted to permit the crossbar and side rod to freely slide in the bores. Compression screws 46 are provided to permit tightening of the bore about the side rods and crossbar and thereby lock any desired position of the rods. The upper face bow carries the tracing styli and centric positioning pins used in my invention.

The tracing styli engage recording pads which are supported by the lower face bow. The lower face bow has posterior, horizontal and vertical recording pads shown as 46 and 47, which are in opposed relationship to the writing styli carried by blocks 48 and 49 on the upper face bow. The lower face bow also carries anterior recording pads 50 and 51 which are beneath the writing styli 52 and 53 supported on the tracing arms 54 and 55 which are secured to the crossbar of the upper face bow.

The relative positions of the upper and lower face bows in the centric position can be recorded by use of the centric check pins such as 56 which is illustrated in the left tracing arm 54. This check pin has a block 57 which can be moved vertically on the pin and tightened by a set screw as shown to register the proper vertical distance between the upper and lower face bows at any setting in the patient's mouth. The pins can be locked in their position in the tracing arm by screws such as 58 shown in the right tracing arm 55.

The upper surface of the lower clutch 43 supports a bearing screw 59 which functions as a fulcrum between the upper and lower clutches and engages a bearing surface in the under side of the upper clutch 41. The pins 56 and screw 59 form a tripod which can be set to accurately position the upper to the lower face bow in the same relative position that these bows had in the centric position of the patient's jaw. The relative positions of the face bows in centric is obtained by securing the upper and lower face bows in the patient's mouth with clutch 41 on the maxillary teeth and clutch 43 on the mandibular teeth. In this position bearing screw 59 engages the under surface of the upper clutch. When the patient closes in centric, the centric pins as illustrated by 56 are placed in the left and right tracing arms. The surfaces of pads 50 and 51 beneath the arms coated with a wax and the points of the pins 56 are heated prior to insertion in the tracing arms. The heated pins melt the wax and thereby accurately record the exact centric position. Clamps 57 are then secured tightly to record the vertical separation of the face bows. The pins are removed and can subsequently be used to properly position the upper to the lower face bow when the tracing device has been removed from the patient and used in setting of a dental articulator.

Figure 5:
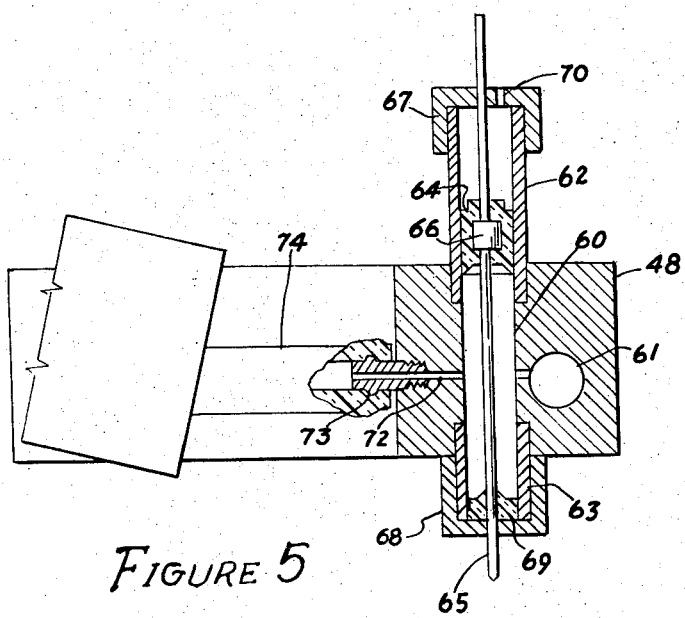
FIGURE 5 illustrates the remotely controllable styli of the tracing device.

Preferably, the tracing device contains remotely controllable styli which can be of any suitable form. A suitable construction employs pneumatically operated styli illustrated in FIGURE 5. The support block such as 48 has two transverse bores 60 and 61 into opposite ends of which are placed, respectively, tubes 62 and 63. The tubes and bore through the lock thereby define a cylinder through which travels piston 64 which is secured to the writing stylus 65. As shown piston 64 is a suitable plastic material such as a silicone rubber which is molded about an enlargement 66 of the stylus. The tubes are closed with caps such as 67 and 68 and the lower end of the stylus is sealed with a plastic or fiber washer such as 69. The upper cap contains an air passageway 70. Communicating with the under or inside surface of the piston is an air passageway 72 which is bored through the cylinder and communicates with bore 60 and 61. A hose connector 73 is tapped into the block 48 and a rubber or plastic tubing 74 is attached to the fixture. A similar construction is used for styli 52 and 53.

Tubing 74 is shown in FIGURE 4 to communicate with a manifold in the upper clutch support block 75. Similar tubing connections are provided to actuate all the writing styli carried by the face bow. A suitable connection orifice 76 is provided which communicates with the pneumatic manifold in block 75 and into this orifice is placed a connector to supply pneumatic pressure to the under side of the piston 64. Means, not shown, are used to supply either a vacuum to the under side of the pistons to urge the writing stylus into engagement against the recording pad or to supply superatmospheric pressure to the underside of the pistons and thereby retract the styli from the recording pads. A control valve is used to permit the operator to control the supply of vacuum and pressure to the manifold and thereby control the movement of the styli.

The recordings are obtained by coating the pads with a suspension of talcum in a volatile solvent which evaporates. The styli are held retracted from the pads and the patient is adjusted to the face bow. Then a vacuum is applied to the cylinders and the styli are drawn into registration against the pads to record the limiting or maximum right and left lateral excursions. When the patient moves to a right lateral excursion, lines 77 and 78 traced on the horizontal posterior pads; see insert of FIGURE 4; and lines 86 and 87 are traced on the anterior pads. The left lateral excursion traces the opposite lines 88, 89, 71 and 79. The protrusive movement is then recorded by protruding the mandible from its centric position. This movement is traced as arc 98 shown on the left posterior vertical pad and as straight lines intersecting the recordings on the anterior and posterior horizontal pads. A view of the right horizontal posterior recording is also shown in FIGURE 8. The degree of immediate side shifting of the mandible is shown on the anterior recordings as lines 87a and 71a which are perpendicular to the protrusive recording.

The remaining portions of the tracing device comprise means to accurately position the face bow on the patient and to position the face bow in a dental articulator. These are hinge axis centering pins 80 which are supported on the posterior ends of the side rods of the lower face bow by support blocks 81. When the lower face bow is placed on the patient's teeth, these blocks are urged to the hinge axis of the jaw by loosening the adjustment blocks 82 of the lower face bow, permitting free movement of the side rod and lower crossbar, thereby allowing centering pins 80 to be brought to the hinge axis. The lower face bow also carries a pin 83 which is used to locate the axis orbital reference plane. This pin is secured to the crossbar by block 84. With the lower face bow placed on the patient's lower jaw, the pin 83 is adjusted so that its upper surface 85 lies in a common horizontal plane with the hinge axis. Pin 83 is of a proper length so that when the lower face bow is placed in a dental articulator, the base of the pin rests on the work table and thereby provides the proper vertical positioning of the lower clutch in the dental articulator.

Figure 6:
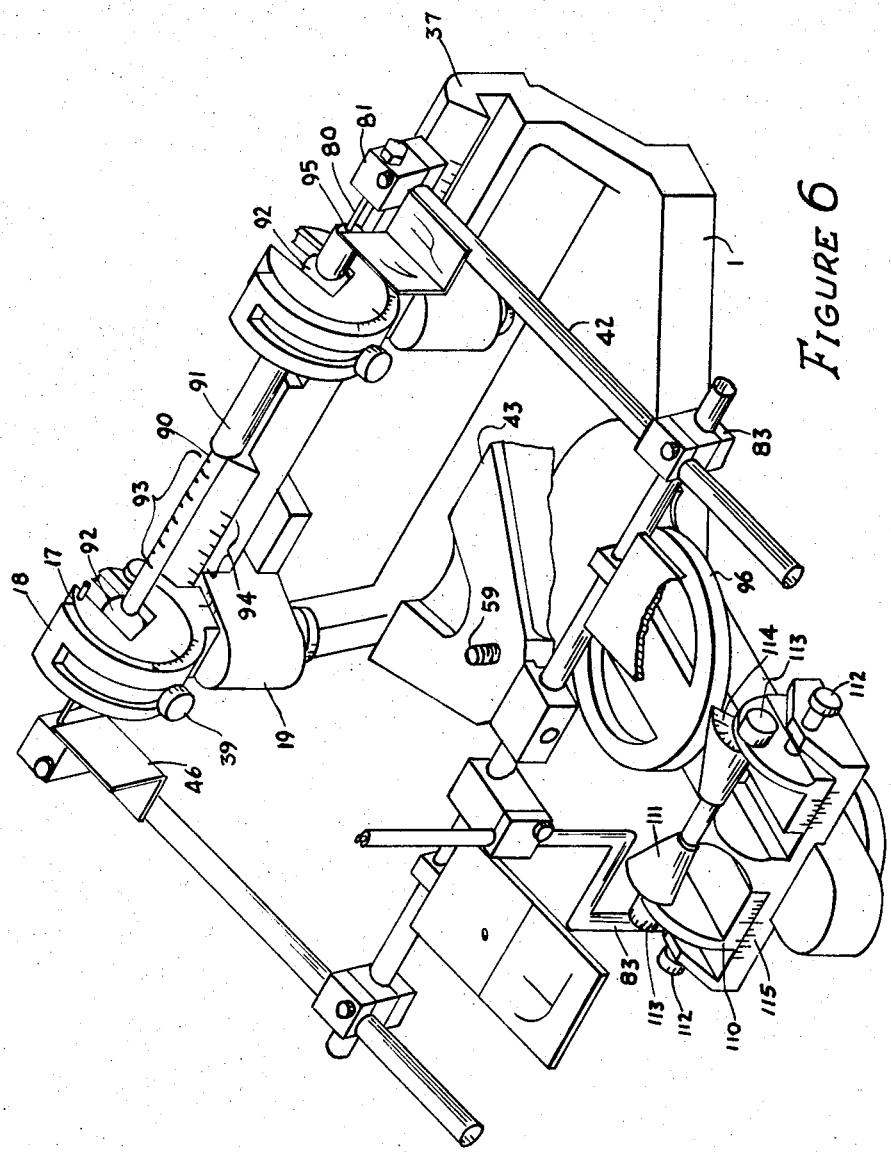
FIGURE 6 illustrates the mounting of the lower face bow assembly of the tracing device in the articulator.

The proper position of the lower face bow in the dental articulator can be seen in FIGURE 6. As shown in FIGURE 6, the lower face bow is mounted in the base of an articulator such as illustrated in FIGURE 1. The lower face bow is placed in the articulator by removing upper frame 2 from the articulator and inserting a mounting axis in its place. This mounting axis comprises telescoping rods 90 and 91 which carry, at their outboard ends, spherical bearings 92. These bearings are slid into the grooved slots of the condyle guides 17. Prior to inserting the mounting axis in the articulator, the mounting axis is extended between the hinge axis centering pins 80 to measure this distance on the calibrated scale 93 of the telescoping member. This distance is then used to set the proper lateral spacing of the condyle support arms 19 on the articulator as indicated on scale 94.

After the mounting axis has been positioned in the articulator, the lower face bow is engaged with the outboard ends of the axis. The ends of the axis contain indentations 95 which receive the ends of centering pins 80 and support the posterior portion of the lower face bow. The anterior portion of the face bow is supported above the work surface by pin 83. With the lower face bow thus supported in the articulator the lower clutch 43 is thereafter secured to the lower ring support 96 by a suitable cold curing plaster, e.g., plaster of Paris, etc. The ring support is secured to the base by a wheel such as 11 (shown in FIGURE 1).

Referring now to FIGURE 7, the remaining procedure will be discussed. After the lower clutch has been plastered to the lower ring 96, blocks 81 and the mounting axis 91 are removed and the upper articulator frame 2 is placed in the articulator. This frame has support shaft 15 which is slidably mounted in spherical bearings 16 which are inserted in the grooved guides of the condyle blocks 17. The frame member 2 is centered on the articulator base 1 by arm 101 of the centric keying means which is shown at the upper right of the articulator. This arm is supported on the crossbar 37 of base 1 by plate 100. The knife edge of 101 is spring biased in a forward position to retain the edge in a centering groove on the articulator upper frame 2 shown at 102.

To plaster the upper clutch to its mounting ring 105, the articulator is closed with blade 106 of incisal pin 107 resting on the incisal table. The upper face bow is then placed on the articulator with the right and left centric pins locked into their centric positions with the stops 57 resting on their sleeves in the tracing arms. In FIGURE 7 the centric pin has been omitted from the left arm to simplify the illustration. As previously mentioned, the centric pins in the tracing arms and the clutch bearing screw 59 shown in FIGURE 4 form a tripod on which the upper face bow rests. In this position the upper face bow has the identical relationship to the lower face bow as it occupied on the patient when the patient's mandible was in the centric position. Upper clutch 41 is then plastered to its ring 105.

The articulator is thereafter ready to be set to trace the protrusive and right and left lateral excursions recorded on the tracing pads from the patient's normal movements. A special feature of my dental articulator is the means for an immediate lateral shift of the upper frame member relative to the base to duplicate this frequent movement of patients. To accurately control and record this movement, the upper frame 2 is provided with lateral shift stops which are positioned on shaft 15 on the inboard side of each of the spherical bearings in the condyle guides. One of the shift stops is shown at the right of the articulator; the second is out of sight on the opposite end of shaft 15. An enlarged view of the stop appears in FIGURE 9 where it is shown to comprise an outer sleeve 124 and a sleeve 121 concentrically positioned therein having a tapered end. Sleeve 124 has a helical groove shown at 125 and a pin 123 extends through this helical groove and is affixed to sleeve 121. The end of 123 is threaded and a cap 109 is turned onto the pin so that it can lock pin 123 at any setting along groove 125. Sleeve 124 is secured to shaft 15 by screw 128 and sleeve 121 is slidably mounted on shaft 15. Movement of pin 123 along the helical groove thus retracts or extends sleeve 121 on shaft 15 and the degree of this movement is indicated by a scale calibrated on the outer sleeve. In this manner the upper articulator frame 2 is provided with means to permit a controlled and precisely measured immediate lateral side shift.

To permit movement of the frame 2 in a lateral direction it is of course essential that the centric keying means be disengageable from frame 2. This is provided by pivoting knife edge 101 on shaft 103 to rotate 101 out of engagement with groove 102.

To provide an immediate shift without vertical movement of the anterior of the frame member 2, the incisal table has provision to shift the lateral incisal guides. These guides comprise cams 111 which are supported by brackets 110 that slide on the table support. In their contracted positions, cams 111 are separated by the thickness of blade 106 which rests on 104. When cams 111 are expanded the incisal guide blade 106 slides on horizontal shaft 104 to provide an immediate shift of the entire frame 2 without vertical movement or separation of the clutches 41 and 43. The extreme lateral position of the right incisal cam 111 is illustrated in FIGURE 7 and this lateral shift is achieved by moving of cam supports 110 with adjustment screws 112. The lateral displacement of supports 110 is indicated on the vernier scale 115 provided on the front of the table.

The incisal guides of the incisal table are best illustrated in FIGURE 6 where the left and right lateral guide surfaces are shown as rotatable cams which are frustro-cones having an eliptical cross-section and segmented to provide a flat surface. The cams are mounted with their apexes adjacent the center guide surface. The leading edge of the cam provided the maximum angle of inclination from its axis and this angle constantly decreases towards the trailing edge of the cam. In this manner any desired angle of inclination, or rate of vertical separation of the clutches 41 and 43, can be provided simply by rotating the cams to the desired setting with knots 113. The angular position of the cams can be observed on a scale such as 114.

The incisal pin on the articulator also has means to provide a protrusive movement having controlled and measured degree of forward sliding of the clutches 41 and 43 without vertical separation followed by a controlled rate of vertical separation such as is caused by bicuspid and frontal teeth engagement. This means is attached to the incisal pin shown in FIGURE 7. The vertical separation can be controlled along any desired path by the angular setting of blade 106 which is rotatably mounted in groove 120 and locked at the desired setting by screw 116. To permit a forward slide without vertical separation, the incisal pin has a sliding link between pin 107 and blade 106. Pin 107 is slidably mounted in slot 117 provided in the top of housing 118. To duplicate the protrusive movement, frame 2 is moved toward the rear of the articulator with bearings 16 sliding in the grooved slots of the condyle guides 17. The travel is limited by a stop in the groove which is engaged by turning screw 108. In the initial protrusive movement, pin 107 can slide in housing 118 for several millimeters until it reaches the limit of its travel against the rear of slot 117. After pin 107 engages the rear of slot 117, then the entire housing moves along a path set by the inclination of blade 106. Screw 119 is provided as a stop or limiting means to provide a controlled adjustment of the degree of travel of pin 107 in housing 118 and a scale can be calibrated on the face of housing 118 to indicate the degree of slack in the link. Pin 107 is connected to a block slidably mounted in the housing and a compression spring, not shown, is provided in the housing to bias this block against screw 119. The screw has only a weak compression force and is used to return pin 107 against the end of adjustment screw 119 when member 2 is returned to centric and released.

The significance of the immediate lateral shift of the articulator will be apparent from inspection of FIGURE 8 which shows a typical right horizontal posterior recording obtained with the tracing device. This recording has line 88 which is traced by the left lateral excursion, line 78 which is traced by the right lateral excursion and straight line 98 traced by the protrusive movement.

Most dental articulators do not have provisions for an immediate side shift and the instrument is set to move from the centric position, C, to the maximum left lateral excursion, L, as a straight path along line C–L. When occlusions fabricated from models made with this instrument are seated in the mouth and the patient makes a lateral excursion, there will be interference since the patient's normal movements are along the curved line 78 and not along the straight path C–L.

Some experimental articulators can be set to faithfully follow the curved limiting border movement 78. These instruments, however, require custom grinding of metal guides and the cost and time required limit the use of these articulators to teaching and research. My articulator can be simply set to provide a tolerance in the occlusion by setting an immediate side shift shown by line C–D using the side shift stops. The articulator is then set to follow line D–L for the remainder of the lateral excursion. The setting of the articulator with this movement will provide a tolerance between the opposing cusps of the occlusion proportional to the distance, C–D (about 0.1 to 3.0 millimeters), thereby eliminating interference upon lateral excursion of the mandible.

Line 78 traced by the right lateral excursion of the patient is illustrated as a typical case wherein the patient exhibits an immediate side shift of the mandible as indicated by the perpendicular intersection of line 78 with line 98. This corresponds to the anterior recording described in regard to FIGURE 4. This immediate side shift is encountered with most patients and aggravates the interference encountered when the occlusions are fabricated from models made with articulators that follow the dashed line C–L.

The articulator is set to duplicate the recordings on the tracing device as shown in FIGURE 7 by moving the articulator member 2 in a right, then left lateral excursion. In the right excursion, member 2 pivots about the left condyle bearing 16. To retain this bearing in its forward position against the front of the groove in the left condyle guide 17, screw 122 is advanced to raise a stop in the base of the groove immediately behind the bearing 16. A similar screw in the right condyle guide is retracted to recess the stop in this guide and thereby permit bearing 16 to freely slide in the guide.

Member 2 is then moved in the right lateral excursion and the anterior stylus 53 is observed to determine if it follows recording 87 on the anterior pad. If it fails to follow the recorded path, arm 19 is slid on frame 37 to a position where the recorded path is duplicated. The procedure is then repeated for the left lateral excursion.

The immediate side shift is then set on the instrument so that the posterior styli will follow path C–D shown in FIGURE 8. The degree of the immediate side shift can be set on the instrument by loosening cap 109 and moving pin 123 of the side shift stop to retract sleeve 121 from its engagement against the condyle bearing 16 until the desired degree of shift C–D is obtained. The degree of this retraction can be read on the scale of the shift stop and recorded with the other settings of the instrument for repeated use. Thereafter the progressive side shift of the instrument can be set by repeating the previously described right and left lateral excursions of member 2 and rotating journals 18 in members 19 until the writing styli follow path D–L of FIGURE 8.

The angle of inclination of the groove in each condyle guides 17 is then set by moving member 2 to the rear of the articulator with the screws 122 retracted to recess the stops in the grooves. As bearings 16 slide in the grooves, the guides 17 are rotated in journals 18 until the posterior styli follow the path of the recording 98 shown on the right vertical posterior pad.

The instrument of my invention also has incisal table means provided that will permit a horizontal movement in a lateral and forward direction to thereby provide for these movements commonly found in patients. In the desired occlusion the jaws are separated by bearing at the cuspids and the lateral excursion of the mandible can follow a substantially horizontal path in the anterior portion before cuspid bearing is encountered. Most articulators can not be set to provide an immediate horizontal movement on the incisal table without separation of the models and occlusions fabricated on these articulators interfere when placed in the mouth before cuspid bearing and jaw separation is reached. The occlusions are uncomfortable in the patient and lead to more serious dental problems unless custom fitted by tedious grinding.

The improved incisal table has means to permit an initial horizontal movement of the anterior of the instrument to thereby permit fabrication of occlusions without posterior interference.

In a similar fashion the protrusive movement of most patients follows a forward movement of the mandible without separation of the teeth until anterior bearing is encountered. Screws 112 are retracted to provide the desired degree of lateral horizontal movement of the anterior of the articulator and cams 111 are rotated to provide the desired degree of vertical separation of the anterior upon lateral excursion. Guide 106 is set to provide the desired degree of vertical separation during the protrusive movement and screw 119 is retracted to permit the desired degree of immediate horizontal protrusion.

The preceding is intended solely to illustrate a mode of practicing my invention and it is apparent that various equivalents to those illustrated can be employed without departing from the scope of the invention which is intended to be defined by the following claims.

I claim:
1. The improved method of reconstructive dentistry that comprises:
   (1) determining the border lateral excursions of a patient's mandible by recording said mandible excursions on a tracing device;
   (2) positioning said tracing device on a dental articulator having first and second members joined together at left and right condyle centers comprising adjustable stops bearing against rotational centers of the other member to simulate said excursions;
   (3) adjusting the articulator by rotation of one of said members about each of said left and right condyle centers to approximate said recording of the patient's mandible excursion;
   (4) retracting said adjustable stops on said articulator to provide an initial and immediate lateral shift of said articulator members without encountering rotation about either of said condyle centers, followed by relative rotation of said members about simulated condyle joints;
   (5) preparing models of dental occlusions on said articulator and moving said articulator members in a measured and controlled degree of immediate lateral shift to thereby provide a lateral tolerance in the cusp-fossa engagement of said occlusions.

2. In the method of reconstructive dentistry wherein models of dental occlusions are prepared on an articulator having first and second members engaged together at incisal guide surfaces located at the anterior of said articulator that are angularly adjustable to provide a desired timed vertical separation of the anterior of said members and that are adjustable to provide entirely horizontal movement in the lateral and longitudinal direction without change in the angular adjustment of said surfaces and wherein the angular positions of said surfaces are adjusted to provide said desired path of engagement; the improved method that comprises adjusting said guide surfaces to provide an immediate horizontal movement in at least one of the lateral and longitudinal directions followed by said timed vetrical separation of the anterior of said members in simulated mandible movements to thereby provide a controlled and predetermined tolerance in the engagement of the forward teeth of said occlusions.

3. In a dental articulator having first and second frame members secured at their posteriors with means to simulate a hinge axis, the improved incisal guide means comprising:
   (1) a central guide member having an incisal pin central guide surface mounted on the anterior of said first frame member;
   (2) lateral guide members on each side of said central guide member forming laterally extended surfaces of said central surface, said members mounted on said first member with means to vary the horizontal inclination of said members;
   (3) means to laterally displace said lateral guide members to permit the variation of the width of said central guide surface; and
   (4) an incisal guide mounted on said second member and adapted to engage said incisal guide surfaces.

4. In the articulator defined by claim 3, the combination of scale means to indicate the degree of said angular inclination and scale means to indicate the degree of lateral displacement of said wing members.

5. In the articulator defined by claim 3 wherein said incisal guide is mounted on said second member by linking means permitting a limited movement, relative to said pin, in a protrusive direction and means to vary the horizontal angle of inclination of said guide in said protrusive direction.

6. In a dental articulator having first and second frame members secured at their posteriors with means simulating a hinge axis, the improved incisal guide means comprising:
   (1) an incisal guide member mounted on the anterior of said first frame member with an incisal pin central guide surface and laterally extending shafts;
   (2) cam wing members formed of segmented frustocones having non-circular cross sections and mounted on said shafts with their apexes contiguous to said central surface;
   (3) means to rotate said wing members about said shafts; and
   (4) means to slide said cams along said shaft.

7. The dental articulator of claim 6 with scale means to indicate the degree of rotation of said cam wing members to thereby indicate the angular inclination of said cam surface and scale means to indicate the degree of lateral displacement of said wing member.

8. In the dental articulator of claim 6, the combination of an incisal pin attached to the anterior of said second frame member, an incisal guide support attached to said pin and an incisal guide rotatably mounted in said support to permit variation in the horizontal inclination of said guide, a slot in the upper surface of said support with the lower end of said pin extended therethrough to provide a sliding link between said support and said pin, resilient means biasing said pin to the anterior of said slot and adjustment means to limit the degree of movement of said pin relative to said support.

9. The dental articulator of claim 8 with scale means to indicate the regree of angular inclination of said incisal guide and scale means to indicate the relative movement of said pin.

References Cited

UNITED STATES PATENTS

| | | | |
|---|---|---|---|
| 1,733,507 | 10/1929 | McCollum | 32—32 |
| 2,119,896 | 6/1938 | Van Dorn et al. | 32—32 |
| 2,549,339 | 4/1951 | Shore | 32—32 |
| 3,035,350 | 5/1962 | Franwick | 32—32 |
| 3,159,914 | 12/1964 | DePietro | 32—20 |
| 3,160,955 | 12/1964 | DePietro | 32—32 |
| 3,256,523 | 6/1966 | DePietro | 346—44 |

RICHARD A. GAUDET, *Primary Examiner.*

J. W. HINEY, *Assistant Examiner.*